J. P. DE L'EAU.
CALCULATING INSTRUMENT.
APPLICATION FILED AUG. 26, 1912.
1,117,805.
Patented Nov. 17, 1914.
2 SHEETS—SHEET 2.
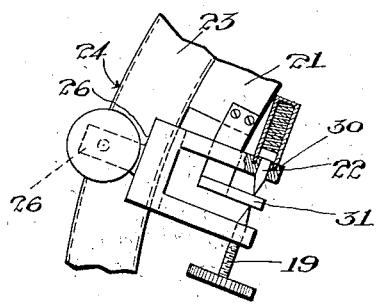
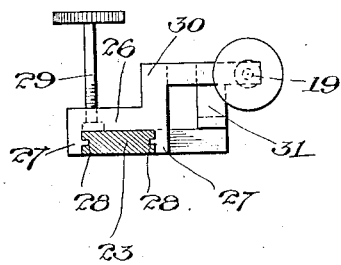
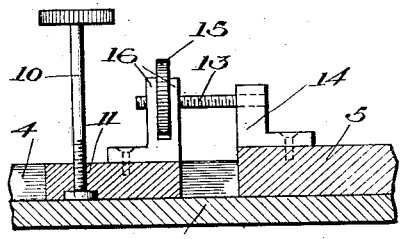
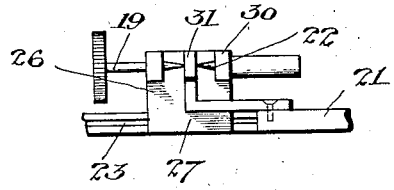
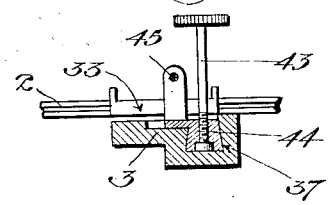

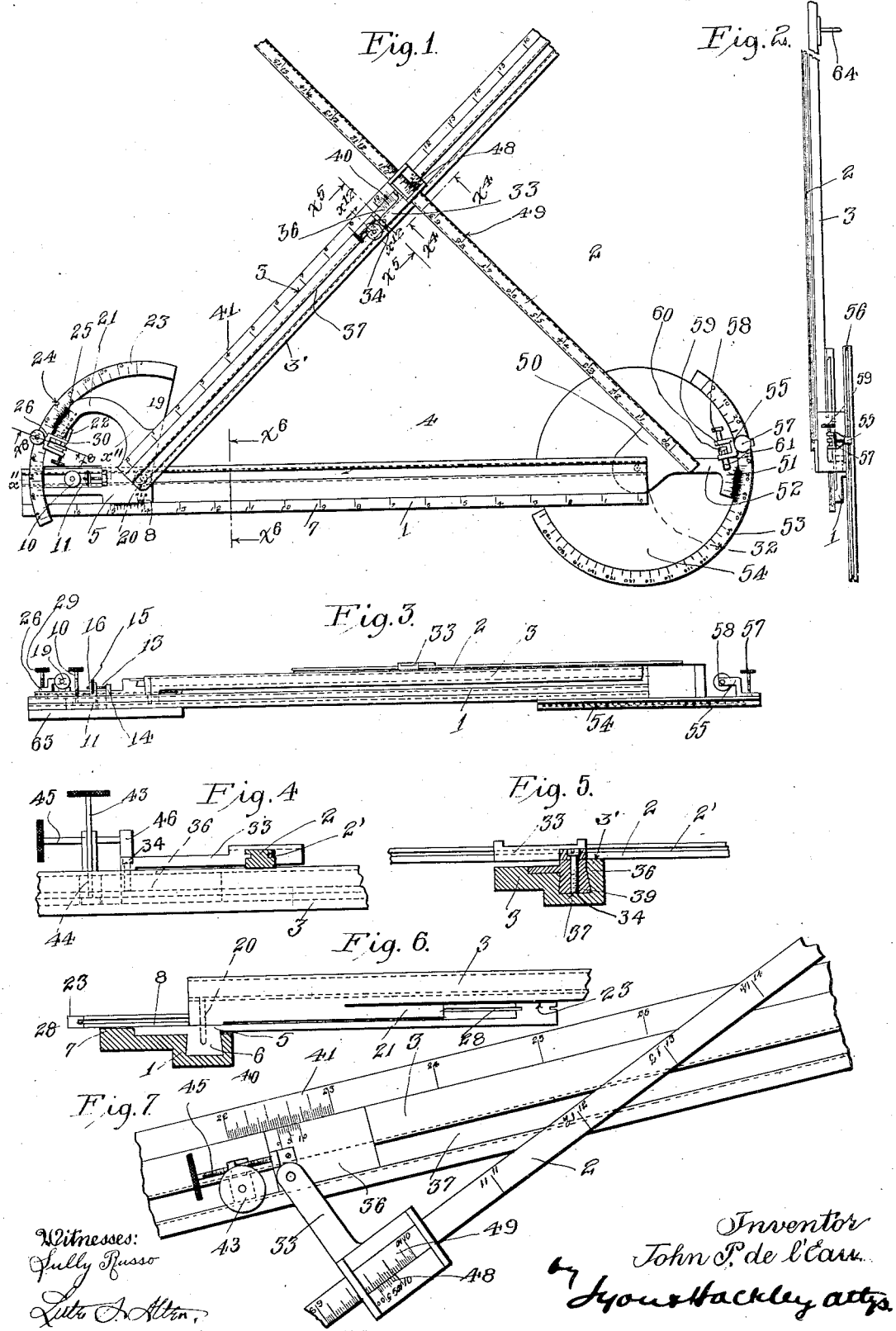
J. P. DE L'EAU.
CALCULATING INSTRUMENT.
APPLICATION FILED AUG. 26, 1912.
1,117,805.
Patented Nov. 17, 1914.
2 SHEETS—SHEET 1.

UNITED STATES PATENT OFFICE.

JOHN P. DE L'EAU, OF BETTERAVIA, CALIFORNIA.

CALCULATING INSTRUMENT.

1,117,805.  Specification of Letters Patent. Patented Nov. 17, 1914.

Application filed August 26, 1912. Serial No. 717,213.

*To all whom it may concern:*

Be it known that I, JOHN P. DE L'EAU, a citizen of the United States, residing at Betteravia, Santa Barbara county, State of California, have invented a new and useful Calculating Instrument, of which the following is a specification.

This invention relates to an instrument for calculating lines and angles and particularly for calculating the different elements of a triangle, namely, the sides and angles thereof.

The instrument is adapted especially for use in triangulation and for calculating latitudes and departures in surveying.

The main object of the present invention is to provide an instrument for the above stated purposes with which the necessary calculations can be made by simply reading the indications on scales after the instrument has been set to positions corresponding to known elements or terms of the calculation.

Other objects of the invention will appear hereinafter.

The accompanying drawings illustrate an embodiment of the invention, and referring thereto:

Figure 1 is a plan of the instrument. Fig. 2 is an end elevation thereof. Fig. 3 is a front elevation of the instrument. Fig. 4 is a section on line $x^4$—$x^4$ in Fig. 1. Fig. 5 is a section on line $x^5$—$x^5$ in Fig. 1. Fig. 6 is a section on line $x^6$—$x^6$ in Fig. 1. Fig. 7 is a plan of the outer joint for the movable scale members of the instrument, showing the same in position for measurement with a scalene triangle. Fig. 8 is a section on line $x^8$—$x^8$ in Fig. 1. Fig. 9 is plan partly in section of the parts shown in Fig. 8. Fig. 10 is an elevation of said parts. Fig. 11 is a section on line $x^{11}$—$x^{11}$ in Fig. 1. Fig. 12 is a section on line $x^{12}$—$x^{12}$ in Fig. 1.

The instrument comprises a base scale member 1, a movable arm or scale member 2 pivotally mounted on the scale member 1 and a movable arm or scale member 3 pivotally and slidably mounted on scale member 1, said members 2 and 3 having at their outer ends a pivotal and sliding connection with each other. The scale member 1 may be formed as a flat bar or rule having a scale 7 along its upper face. Said member 1 is provided with a longitudinal groove 4 in which slides a slide member 5, said slide member and groove being dovetailed as indicated at 6 to retain the slide member in position within the groove while permitting longitudinal adjustment thereof. Said slide member is provided with means for reading on the scale 7, said means being preferably a vernier 8 on said slide member, and to enable accurate adjustment of said slide member to the vernier reading, clamping and adjusting means are provided consisting of a thumb-screw 10 working in a sliding block 11 which slides in the longitudinal groove 4 in the slide member 1, said screw 10 engaging at its lower end with the member 1. A set screw 13 is provided for adjusting the slide member 5 relatively to the sliding block 11, said adjusting screw being for example fastened to a lug 14 on the slide member 5 and being engaged by a thumb nut 15 turning between two lugs 16 on the sliding block 11. By clamping the slide block 11 in position by means of the clamp screw 10 and then turning the thumb nut 15, the slide member 5 may be adjusted longitudinally of the base scale member 1.

The arm or scale member 3 is formed as a bar pivoted to the slide member 5 by a pivotal connection or pin 20 and is provided with an arm 21 which is adapted to move along the inner edge of a segmental scale member 23 affixed to slide member 5, said scale member 23 being provided with scale marks 24 corresponding to angles and said arm 21 being provided with a vernier scale 25 for reading on the scale 24. A clamp 26 embraces the segmental scale member 23 and is provided with tongues or lugs 27 engaging in grooves 28 in the inner and outer edges of said segmental scale member 23, said clamp being provided with a set screw 29 for clamping it in position on said member 23 and having a yoke 30 between the arms of which extends a lug or bracket 31 on the arm 21, said lug or bracket engaging between a spring stop 22 on said yoke and an adjusting screw 19. By fixing the clamp 26 in position on the member 23 and then turning the adjusting screw 19 the arm 21 and member 3 may be given an accurate angular adjustment.

The arm or scale member 2 is formed as a bar pivoted to the base scale member 1 by a pivotal connection or pin 32 and extends slidably through a swinging arm 33 which is pivoted at 34 to a slide member 36 sliding in a longitudinal groove 37 in the scale member 3, said groove and slide member 36 being dovetailed as shown at 39 to retain the slide member on the scale member while enabling its longitudinal adjustment. Arm 33 acts as a guide member for the bar 2. The slide member 36 is provided with a vernier 40 reading on a scale 41 formed on the upper face of the scale member 3. A sliding block 44 slides in the longitudinal groove 37 and may be clamped in any desired position by a clamp screw 43, and a set screw 45 working in said sliding block engages with a lug 46 on the slide member 36 to provide for accurate longitudinal adjustment thereof. The swinging arm 33 is provided with a vernier 48 reading on a longitudinal scale 49 on the scale member 2. Said scale member 2 is connected to its pivot pin 32 by a bracket 50 which offsets the scale a distance from its pivot equal to the distance of the said scale to the pivot 34 for the swinging arm 33 so that this scale is offset the stated distance from the corresponding side of the triangle which passes through the pivots 32, 34. The angular position of the arm or scale member 2 is measured by a vernier 51 on an arm 52 of said scale member reading on a segmental scale member 53 which is formed on a disk 54 rigidly secured to the base scale member 1. A clamp 55 is provided, having lugs engaging in grooves 56 in the segmental member 53 and clamped thereon by a set screw 57, said clamp having a fork 59 embracing a bracket 60 extending from the arm 52 and an adjusting screw 58 and stop 61 is provided on said fork for engaging said bracket in the adjusting operation. The construction and operation of this clamp is similar to that for the arm 21.

It will be understood that the disk 54 is adapted to rest on any suitable table or support and the farther end of the scale member is provided with a downward extension 63 and the scale member 3 is provided with a downwardly extending pin 64 so as to support the several parts on said table or surface, and in operation, the scale member 3 swings above the scale member 1 and the scale member 2 swings above the scale member 3. Scale arm 3 is provided with an upwardly extending flange or ledge 3' over which the arm 33 works, so as to prevent said arm 33 from wearing the graduated part of the arm 3. The guide means 4 on the base scale member 1 extends past the pivotal connection 32 for the third scale member 2, so that the slide member 5 may pass said pivotal connection, enabling the reading point 8 on said slide member to be brought to zero on the scale member 1. The guide means 37 on the second scale member 3 extends past and above the pivotal connection 20 of said scale member with the slide member 5 so as to enable the slide member 36 to pass said pivotal connection so as to read to zero on the second scale member. The third scale member 2 is offset sufficiently from the pivotal connections 34 and 32 to enable the guide means 33 to pass the pivotal connection 32 so as to read to zero on the third scale member 2. By this means I am enabled to adjust the triangle constituted by the three scale members to any condition whatever and to read down to zero for any angle or any length of the triangle.

The instrument is used as follows: The slide member 5 is adjusted along the base member 1 so that the vernier on such slide member reads to the length on the scale 7 corresponding to the base of the triangle to be calculated, the initial point of the scale 7 being measured from the pivot 32. The scale members 2 and 3 are then set to angular positions by their scale segments 23 and 53 according to the required angles and the readings for the corresponding sides are taken by the verniers and scales on said scale members 2 and 3. It will be observed that the scale member 2 is offset from the line joining the pivots 34 and 32, said line being the corresponding side of the triangle, but the scale on the scale member 2 being measured with relation to the pivotal points so that the reading is identical with the corresponding side of the triangle.

It will be understood that in each case where there is a sliding connection, a joint is provided for retaining the parts from lateral displacement, thus the slides 11 and 44 are provided with dovetailed portions fitting in corresponding grooves, and that the swinging arm 33 is provided with tongue portions engaging in corresponding grooves 2' in bar 2.

The device can be used to compute the sides and angles of any shaped triangle, but it is primarily intended to eliminate the laborious mental strain which accompanies the calculations of the polar coördinates commonly known as latitude and departures, or right-angle triangles. The computation of triangles involves all classes of work, and the application of this device is almost universal in this respect. It does away with the tables of sines and co-sines, and the resulting labor of checking for verification. It can be used for the following computations: Right-angle triangles (latitudes and departures, and vertical angles). Oblique triangles, triangulation (covering the four cases in plane trigonometry). In addition the position of slope stakes may be determined with it. Also, the computation of resultants in force diagrams.

It is presumed that the operator of the instrument has had experience in surveying, in the use of the transit, and also in the use of the different scales, or unit measurements, in drawing maps, plans, etc. To use, place the instrument in front on a flat surface, with the side numbered 1 nearest the operator. This will place an arc on either side, hereinafter referred to as the left and right arcs. The arcs are divided to 30 minutes, and with the vernier can read to one minute. The scales are divided into units of ten, and the corresponding verniers to one-tenth of the unit of measurement taken. The scales can be used the same as ordinary drawing scales, 1″ equals 1′—10′—100′ etc., or any multiple of five or ten. Of course, the scale taken will have to apply on all three arms in each case, the closeness of the work depending upon the unit of the scale adopted. In making latitude and departure calculations, the arms 2 and 3 may be set at an angle of 90° and the angles between the respective arms 2 and 3 and the base member 1 are in that case complementary, and the base member 1 is the hypotenuse for the latitudes and departures. Furthermore, with any triangle the angle of intersection of the members 2 and 3 is supplementary to the sum of the other two angles, so that when two angles have been found, the third angle may be immediately found by calculation.

Example: Given a course of N. 33° 25′ W—780. To find the polar coördinates. Set off on the base arm numbered 1 the distance 780. Then adjust the arm numbered 3 to read 33° 25 on the vernier. Then with their two adjustments rigid, by the aid of the adjusting parts on the outer end of arm 3, bring the arm 2 to such a position that the vernier at its pivot end will read the complement of the angle of 33° 25, which is 56° 35. Then it is obvious that the angle at the intersection of arms 2 and 3 will be 90°, when the lengths of the resulting coördinates can be read by the vernier. It is always necessary to set off the given angle and its complement, for right-angle triangles, which makes the arms 2 and 3 automatically adjust themselves to intersect at an angle of 90°.

Example (case I): Given an oblique triangle with any two angles and one side given, say 29 degrees 58 min., 75 degrees 33 min., and a side of 1053. Set off on arm 1 the number 1053, then on the left hand set off 29 deg. 58 min.; and on the right hand arc set off 75 deg. 33 min. The angle at the intersection of the arms 2 and 3 will then be the supplement of these angles, which will be 74 deg. 29 min., when the required lengths of the remaining sides can be read directly from arms 2 and 3. When the supplement of two angles is more than 90 degrees, always set the supplement off on the right hand arc.

Example (case II): Given a triangle with two sides and the angle opposite to one of them, say 1053, 508, and angle opposite to one of them 29 deg. 58 min.; to find the other side and angles. Set off one side, say 1053, on the base arm 1 and clamp in position. Then set off 508 on arm 3, and clamp. Then move arm 3 until the vernier on the right hand side reads the given angle 29 deg. 58 min. The remaining side will then be on arm 2, the second angle will be on the left hand arc, and the third angle will be, of course, the supplement of the other two.

Example (case III): Given a triangle with two sides and the angle included between them, say 1053, 508, and 29 deg. 58 min. Set off on the base arm 1, 1053, and clamp in position. Then set the left hand vernier to read the given angle of 29 deg. 58 min., then slide arm 2 along by the block in arm 3 until the vernier on arm 3 reads 508. Then the second angle on the right hand vernier can be read, and the third angle will be the supplement of the other two. The remaining side is read on arm 2.

Example (case IV): Given a triangle with all three sides, say 1053, 508 and 803, to find the three corresponding angles. Set off 1053 on arm 1 and clamp in position, then set off 508 on arm 3 and clamp, then move arm 3 until the remaining side 803 can be read on arm 2. Two angles can then be read on the two arcs, and the third will be the supplement of the other two.

These examples will fit any work which requires the computation of triangles. Vertical angles are, of course, similar, as are also the position of slope stakes.

What I claim is:—

A triangular calculating instrument, comprising a base scale member 1 having a longitudinal guide means 4, a slide member mounted to slide longitudinally on the said guide means on the base scale member, a second scale member pivotally connected at a point 20 on said slide member and provided with a longitudinal guide means, a slide member mounted to slide on the latter guide means, an arm pivotally mounted at a point 34 on said latter slide member and provided with guide means offset from its pivotal point, and a third scale member mounted to slide in said latter guide means and pivotally connected at a point 32 on said base scale member, said third scale member being offset from the pivotal connection 32 on the base scale member to enable the pivot 34 of the slide means on said arm to move along said third scale member to place its pivot 34 in coincidence with the pivot 32 of said third scale member, said first guide means 4 on the said base scale member 1 extending past the pivotal connection 32, between said third scale member and base scale member to enable the first slide member pivot 20 on said base scale member to be placed in coincidence with said pivotal connection 32, and said guide means on said second scale member extending past and above the pivotal connection 20 thereof to said first named slide member to enable the pivot 34 of the second named slide member to be placed in coincidence with said pivotal connection 20 whereby angles or distances down to zero may be read at each angle or side on the triangle.

In testimony whereof, I have hereunto set my hand at Los Angeles, California, this 20th day of August, 1912.

JOHN P. DE L'EAU.

In presence of—
 ARTHUR P. KNIGHT,
 MARY E. BLASDEL.